(12) United States Patent
Angelini et al.

(10) Patent No.: US 11,703,207 B2
(45) Date of Patent: Jul. 18, 2023

(54) LIGHTING DEVICE AND STAGE LIGHT FIXTURE COMPRISING A PLURALITY OF SUCH LIGHTING DEVICES

(71) Applicants: OSRAM GmbH, Munich (DE); CLAY PAKY S.p.A, Seriate (IT)

(72) Inventors: Marco Angelini, Trivolzio (IT); Aris Quadri, Seriate (IT); Alberto Alfier, Vedelago (IT); Renato Frison, Chions (IT); Davide Ferrati, Brembate (IT)

(73) Assignee: CLAY PAKY S.p.A., Seriate (IT)

( * ) Notice: Subject to any disclaimer, the term of this patent is extended or adjusted under 35 U.S.C. 154(b) by 0 days.

(21) Appl. No.: 17/735,580

(22) Filed: May 3, 2022

(65) Prior Publication Data

US 2022/0357016 A1 Nov. 10, 2022

(30) Foreign Application Priority Data

May 5, 2021 (IT) .......................... 102021000011456

(51) Int. Cl.
| | |
|---|---|
| *F21V 7/00* | (2006.01) |
| *F21V 7/07* | (2006.01) |
| *F21V 7/06* | (2006.01) |
| *F21V 8/00* | (2006.01) |
| *F21W 131/406* | (2006.01) |

(52) U.S. Cl.
CPC .............. *F21V 7/0033* (2013.01); *F21V 7/06* (2013.01); *G02B 6/0008* (2013.01); *F21W 2131/406* (2013.01)

(58) Field of Classification Search
CPC ...... F21V 7/06; F21V 7/07; F21V 7/08; F21V 7/09; F21V 7/0033; F21W 2131/406; F21S 41/24; F21S 41/36; F21S 41/365
See application file for complete search history.

(56) References Cited

U.S. PATENT DOCUMENTS

| | | | |
|---|---|---|---|
| 10,352,539 B2 | 7/2019 | Bowden et al. | |
| 2013/0201715 A1* | 8/2013 | Dau | ..................... G02B 6/0096 362/551 |

FOREIGN PATENT DOCUMENTS

| | | |
|---|---|---|
| EP | 3 064 986 A1 | 9/2016 |
| EP | 3 135 992 A1 | 3/2017 |
| WO | 2018/158246 A | 9/2018 |

* cited by examiner

*Primary Examiner* — Sean P Gramling
(74) *Attorney, Agent, or Firm* — DLA Piper LLP (US)

(57) ABSTRACT

A lighting device produces scenic effects including a light source group; a light guide extending along a longitudinal axis and coupled to the light source assembly defining an optical path; a primary mirror arranged along the longitudinal axis facing the light source assembly to reflect the light beam from the light guide; and a secondary mirror facing the primary mirror to reflect the light beam reflected by the primary mirror towards an emission area surrounding the primary mirror, wherein a primary reflecting surface of the primary mirror has at least one first portion having a first hyperbolic shape or a first aspherical shape of even order and degree equal to or greater than four and a secondary reflecting surface of the secondary mirror has at least one second portion having a second hyperbolic shape or a second aspherical shape of even order and degree equal to or greater than four.

15 Claims, 7 Drawing Sheets

LIGHTING DEVICE AND STAGE LIGHT FIXTURE COMPRISING A PLURALITY OF SUCH LIGHTING DEVICES

TECHNICAL FIELD

This disclosure relates to a lighting device that produces scenic effects and a stage light fixture comprising a plurality of such lighting devices.

BACKGROUND

In the entertainment sector, they are often used light fixtures comprising a plurality of lighting devices generally placed one beside the other and configured to create scenic effects with light effects produced by light beams.

An example of scenic light fixtures of the type identified above is disclosed in U.S. Pat. No. 10,352,539.

The entertainment industry is constantly searching for solutions that are compact and at the same time able to create new light effects with high-quality light beams.

To be able to produce all the required light effects, the lighting devices have optical systems based on different principles and having different technical characteristics. The currently used optical systems, however, require heavy and particularly bulky structural elements. This makes it more difficult to handle, install and transport optical lighting devices and light fixtures comprising the devices.

In the field of scenography, the dimensions of lighting devices and light fixtures are very important. In most instances, stage installations need to be mounted and dismantled in a short time, and handling, arranging and fixing smaller-sized lighting devices and fixtures is undoubtedly advantageous.

It could therefore be helpful to provide a lighting device of the type identified above that is extremely versatile and free from known drawbacks.

SUMMARY

We thus provide a lighting device that produces scenic effects comprising:

a light source assembly;

a light guide extending along a longitudinal axis and coupled to the light source assembly to define a defined optical path;

a primary mirror arranged along the longitudinal axis facing the light source assembly to reflect the light beam coming out from the light guide;

a secondary mirror facing the primary mirror to reflect the light beam reflected by the primary mirror towards an emission area surrounding the primary mirror, wherein the primary reflecting surface of the primary mirror has at least one first portion having a first hyperbolic shape or a first aspherical shape of even order and degree equal to or greater than four and the secondary reflecting surface of the secondary mirror has at least one second portion having a second hyperbolic shape or a second aspherical shape of even order and degree equal to or greater than four.

Due to the particular claimed optical configuration, the overall dimensions of the lighting device are small compared to known solutions.

The particular configuration of the primary mirror and secondary mirror allows a reduction in axial dimensions, as it brings the light guide outlet closer to the primary mirror, while ensuring high light efficiency.

In addition, the configuration of the primary mirror and secondary mirror also allows a reduction in the overall dimensions of the lighting device, not just the axial dimensions. With the claimed configuration, in fact, the dimensions of the primary mirror and the secondary mirror are reduced and, at the same time, the quality and efficiency of the projected light beam is maintained at levels comparable to those obtainable in known solutions characterized by larger dimensions.

We also provide a stage light fixture that is compact and, at the same time, able to realize light effects with high quality and efficiency light beams, wherein the stage light fixture comprises a plurality of lighting devices having the above-mentioned characteristics.

BRIEF DESCRIPTION OF THE DRAWINGS

Further characteristics and advantages will become clear from the following description of a non-limiting example thereof, with reference to the figures of the attached drawings.

DETAILED DESCRIPTION

Figure 1:
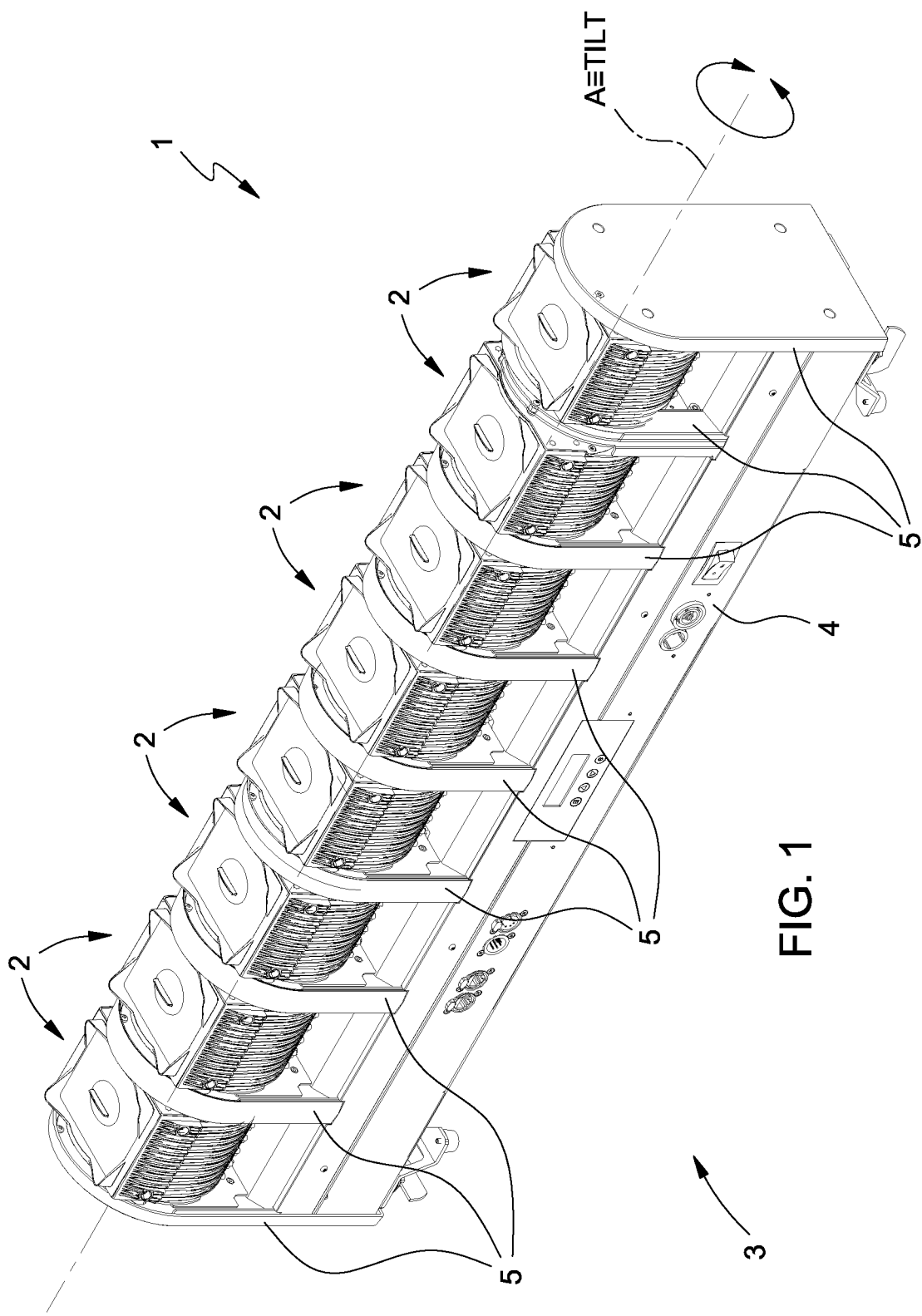
FIG. 1 is a schematic perspective representation, with parts removed for clarity, of a stage light fixture comprising a plurality of lighting devices.

In FIG. 1, reference number 1 denotes a stage light fixture comprising a plurality of lighting devices 2 and a support assembly 3 configured to support the plurality of lighting devices 2. Each lighting device 2 is configured to emit a respective light beam and can be controlled independently of the other lighting devices 2. The lighting devices 2 are arranged aligned along a longitudinal axis A. The support assembly comprises a base 4 and a plurality of arms 5, which extend orthogonally from the base 4.

Each lighting device 2 is rotatably supported by two respective parallel arms 5, which substantially form a forked structure. The arms 5 are substantially orthogonal to the longitudinal axis A. The arms 5 arranged between two adjacent lighting devices 2 support two lighting devices 2 each, while the end arms 5 arranged at the ends of the base 4 support only one lighting device 2.

Each lighting device 2 is rotatably supported by the respective arms 5 about an axis commonly referred to as TILT. Preferably, the TILT axis coincides with the longitudinal axis A.

In the non-limiting example herein described and shown, each lighting device 2 is supported by the respective arms 5 to be able to rotate about the TILT axis between 0° and 270°.

According to another example not shown, each lighting device is supported by its respective arms so that it can rotate about the TILT axis between 0° and 360° so that several complete revolutions about the TILT axis can be made.

In accordance with a further example not shown, the support assembly 3 comprises a further support to which the base 4 can be rotatably coupled to rotate about an axis commonly known as PAN.

In the non-limiting example herein described and shown, the stage light fixture 1 comprises eight lighting devices 2 and the overall length of the stage light fixture 1 along the longitudinal axis A is approximately 1 meter. In other words, the stage light fixture 1 is capable of generating eight light beams per meter.

Figure 2:
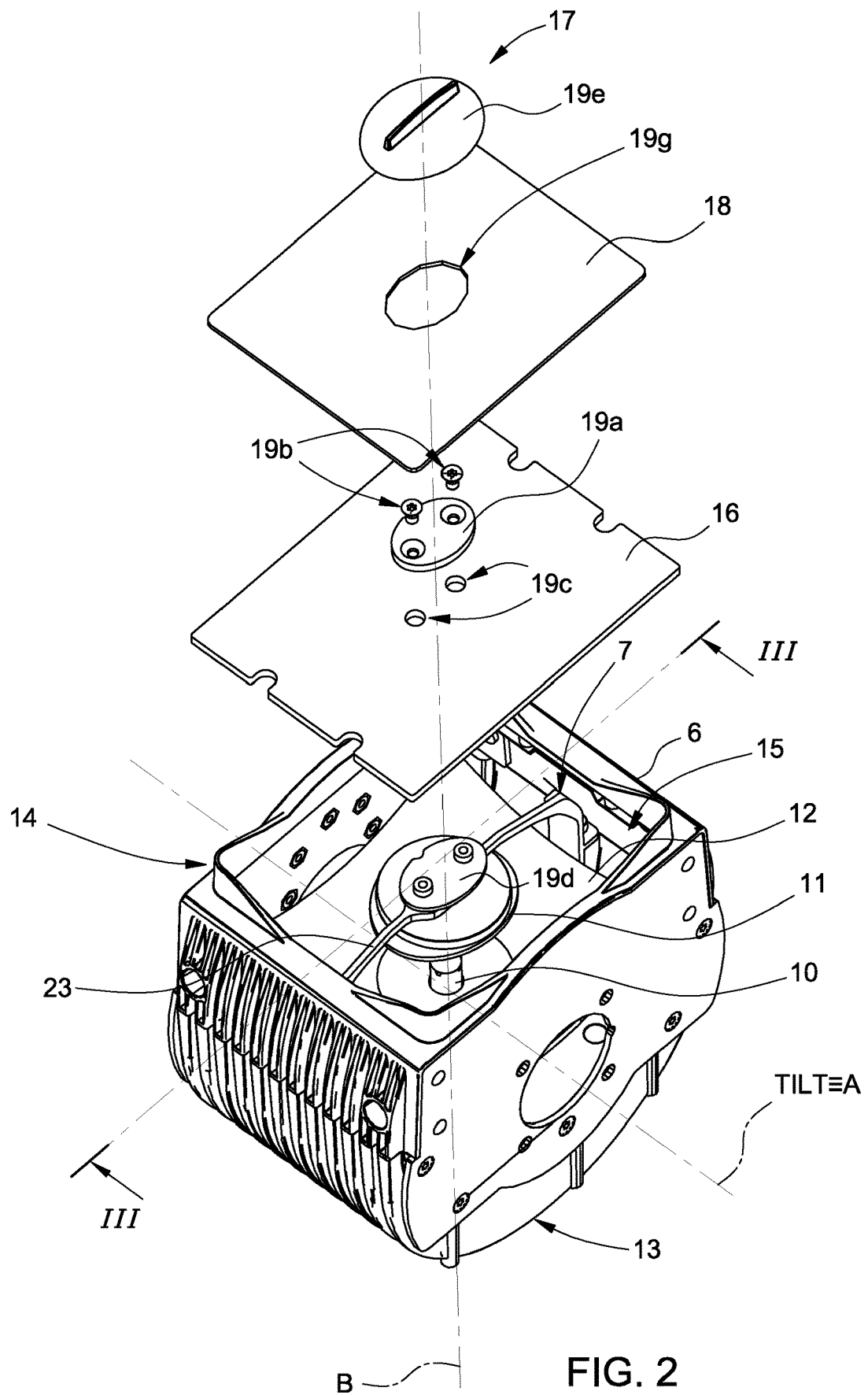
FIG. 2 is a perspective schematic representation, with exploded parts and parts removed for clarity, of a lighting device.
Figure 3:
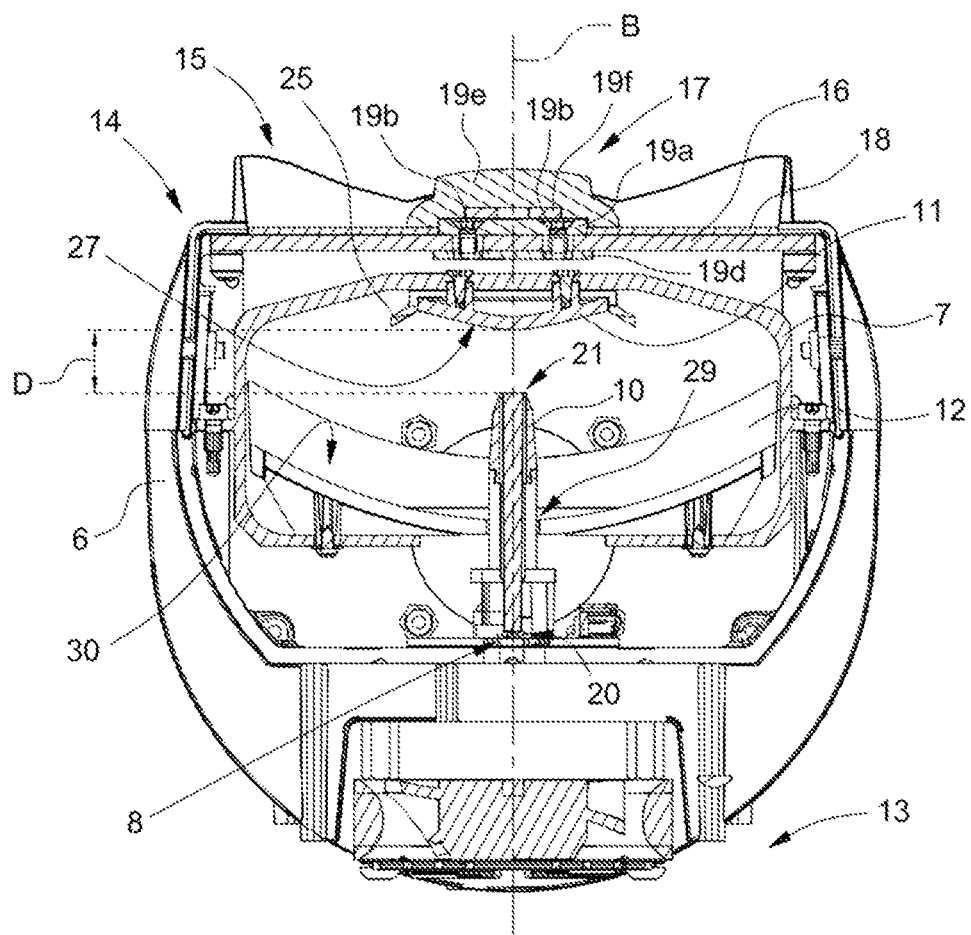
FIG. 3 is a schematic sectional view, with parts removed for clarity, of the lighting device of FIG. 2 along the plane III-III.

Referring to FIGS. 2 and 3, each lighting device 2 has a casing 6, a frame 7 coupled to the casing 6, a light source assembly 8 (schematically represented only in FIGS. 3 and 4) coupled to the casing 6, a light guide 10 coupled to the light source assembly 8 to define a defined optical path, a primary mirror 11 facing the light source assembly 8 to reflect the light beam coming out from the light guide 10 and a secondary mirror 12 facing the primary mirror 11 to reflect the light beam reflected by the primary mirror 11 towards an emission area surrounding the primary mirror 11.

The casing 6 is rotatably coupled to the arms 5 (not shown in FIGS. 2 and 3), extends along a longitudinal axis B and is provided with a first closed end 13 and a second end 14, opposite to the first closed end 13 along the axis B, and provided with a projection outlet 15, which defines, as seen in detail below, the emission area of the light beam generated. In the non-limiting example herein described and shown, the projection outlet 15 has a substantially polygonal cross-section, preferably four-sided such as square or rectangular. Thereby, the lighting devices 2, when coupled to the support assembly 3, have a smaller footprint along the axis A compared to known solutions having a circular projection outlet, with the same emission area and beam quality (highly collimated beam with an exit angle of less than 3°). Such a solution allows in fact to arrange at least eight lighting devices 2 per meter one beside the other.

At the end 14, the casing 6 is provided with a closure element 16.

Preferably, the closure element 16 has a shape complementary to the projection outlet 15 and is fixed perimetrally to the body of the casing 6.

Preferably, the closure element 16 is transparent to light radiations and has no particular optical properties. According to other examples not shown, the closure element 16 may comprise one or more optical elements for processing the light beam coming out.

The closure element 16 has a coupling device 17 configured to releasably couple an optical element 18 to the closure element 16 itself. The optical element 18 is coupled to the closure element 16 to be an "outlet" optical element 18. In other words, the light beam emitted by the light source unit 8 firstly meets the closure element 16 and then the optical element 18.

Preferably, the coupling device 17 is of the magnetic type and comprises a metal plate 19*a* fixed to the outer face of the outlet element 16 (for example, by screws 19*b* housed in holes 19*c* of the closure element 16 and by a further perforated plate 19*d* arranged on the inner face of the outlet element 16), and a fixing element 19*e* comprising at least a portion 19*f* (visible only in FIG. 3) made of ferromagnetic material.

The optical element 18 has an opening 19*g* dimensioned to allow housing the metal plate 19*a*.

Different techniques for fixing the optical element 18 to the outlet element 16 may be adopted.

As shown in detail later, the metal plate 19*a*, the fixing element 19*e* and the opening 19*g* are arranged along the axis B and have dimensions smaller than, or at most equal to, the dimensions of the primary mirror 11. Thereby, the coupling device 17 does not interfere with or obstruct the light beam emitted by the lighting device 2. The optical element 18 is preferably a diffusive optical element and can be releasably fixed to the closure element 16.

In use, the optical element 18 is coupled to the closure element 16 only if required by stage requirements. The frame 7 is housed in the casing 6 and supported by the casing 6. The light source assembly 8 is housed in the casing 6 and fixed thereto and configured to generate a light beam.

Preferably, the light source assembly 8 is configured to generate light radiations of different colors. In the non-limiting example herein described and shown, the light source assembly 4 comprises a plurality of light sources (not visible in the attached figures), arranged one beside the other on a planar support.

Preferably at least two of the plurality of light sources are configured to generate light radiations of different colors. In other words, at least two light sources are configured to generate light beams having different emission spectra.

In the non-limiting example herein described and shown, there are four light sources and they are RGBW (Red Green Blue White) sources. The light sources may be LEDs or may comprise laser diodes of different colors.

According to another example, the light source assembly 8 may comprise at least one laser source such as direct emission (e.g., RGB) or LARP (laser activated remote phosphor) associated with a phosphor wheel to allow varying the color of the light radiation emitted by the LARP source.

Other examples provide the light source assembly 8 to comprise halogen lamps or discharge lamps.

The light guide 10 extends substantially along the axis B and is coupled to the light source assembly 8 to collect the light beam emitted by the light source assembly 8 and define a defined optical path.

Preferably, the light guide 10 is an optical mixing tube provided with an inlet 20 and an outlet 21. The inlet 20 is coupled to the light source assembly 8. The outlet 21 is preferably has a closure element transparent to light radiation. According to examples not shown, the outlet 21 may be open or provided with a phosphor converter. Preferably, the inlet 20 is shaped to collect as many light beams as possible. In particular, the inlet 20 defines an inlet passage having an area at least equal to the area of the emission surface defined by the light sources. More particularly, the area of the inlet passage is greater than the area of the emission surface defined by the light sources.

Preferably, the inlet 20 is shaped to substantially surround the light sources.

Preferably, the shape of the cross-section of the inlet passage 20 is chosen according to the shape of the emission surface defined by the light sources which may, for example, have a circular, square, elliptical, hexagonal, polygonal or any other shape.

In the non-limiting example herein described and shown, the optical tube 10 has a substantially hexagonal cross-section. Preferably, the optical tube 10 has an increasing cross-section from the inlet 20 to the outlet 21. The degree of enlargement of the optical tube 10 is defined to determine a light beam coming out from the outlet 21 of the optical tube 10 that strikes the primary mirror 11 while minimizing the losses of light radiation.

The primary mirror 11 is arranged along the axis B facing the light source assembly 8 to reflect the light beam coming out from the light guide 10. In detail, the primary mirror 11 is supported by the frame 7 so that the outlet 21 of the optical tube 10 is arranged at a distance D from the primary mirror 11.

Preferably, the frame 7 comprises a strut 23, which extends substantially facing the light source assembly 8 and supports the primary mirror 11.

The distance D is preferably 10 to 19 mm, more preferably 10 to 15 mm. The primary mirror 11 is preferably surrounded by a hood element 25, configured to prevent loss of light radiation. Preferably, the hood element 25 is defined by a truncated-cone element surrounding the primary mirror 11 and diverging towards the light source assembly 8.

The primary mirror 11 is preferably convex and has a substantially circular or elliptical perimeter. The primary mirror 11 has a primary reflection surface 27 that faces the light source assembly 8. The primary reflecting surface 27 of the primary mirror 11 has at least one first portion having a hyperbolic shape or an aspherical shape of even order and degree equal to or greater than four.

Preferably, the primary reflecting surface 27 has an axisymmetric shape.

In the non-limiting example herein described and shown, the entire primary reflecting surface 27 has a hyperbolic shape.

Figure 5:
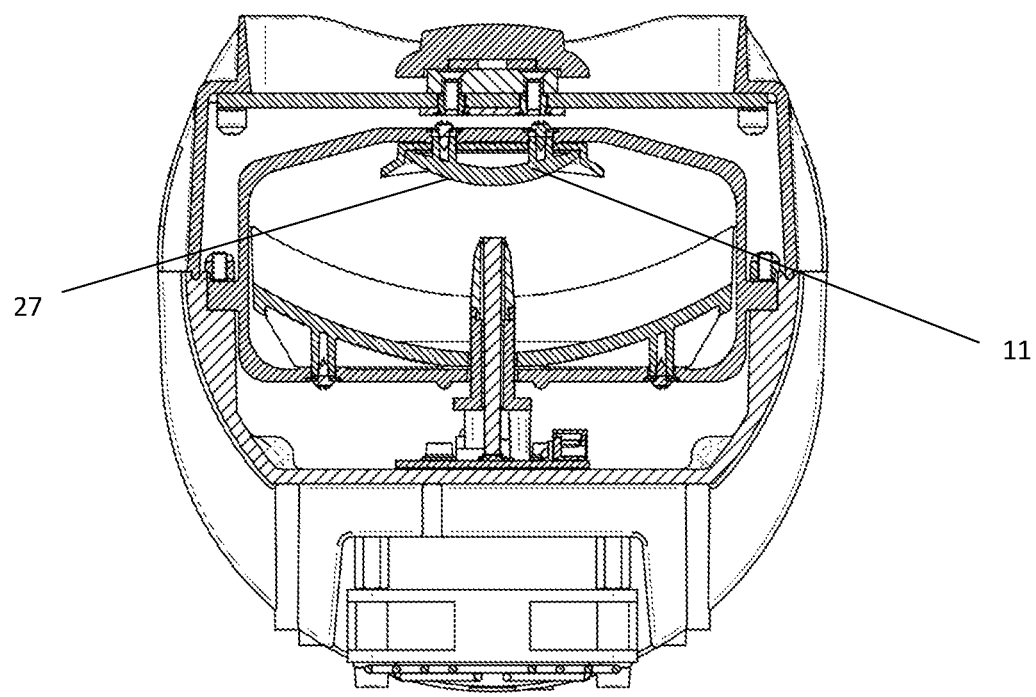
FIG. 5 is a schematic sectional view, with parts removed for clarity, of a lighting device having a toric primary mirror.

According to another example not shown in FIG. 5, the primary reflecting surface 27 has a toric shape.

Figure 6:
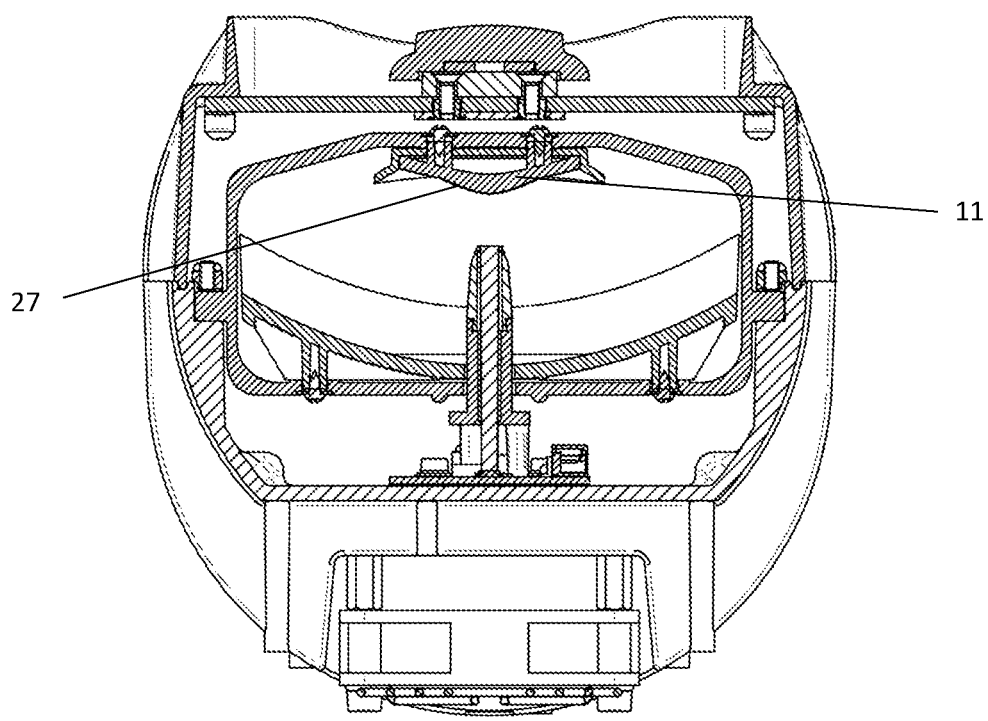
FIG. 6 is a schematic sectional view, with parts removed for clarity, of a lighting device having a primary mirror including a third portion.

According to yet another example shown in FIG. 6, the primary reflecting surface comprises at least one further portion having a hyperbolic shape, preferably different from the hyperbolic shape of the first portion, or an aspherical shape of even order and degree equal to or greater than four preferably different from the aspherical shape of even order and degree equal to or greater than four of the first portion.

Figure 8A:
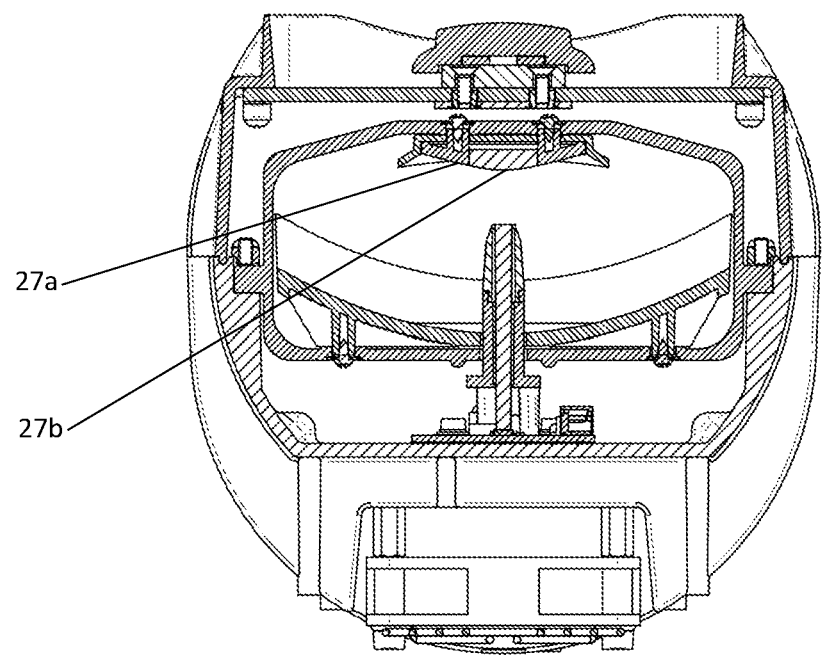
FIG. 8A is a schematic sectional view, with parts removed for clarity, of a lighting device having a movable primary mirror in Position A.
Figure 8B:
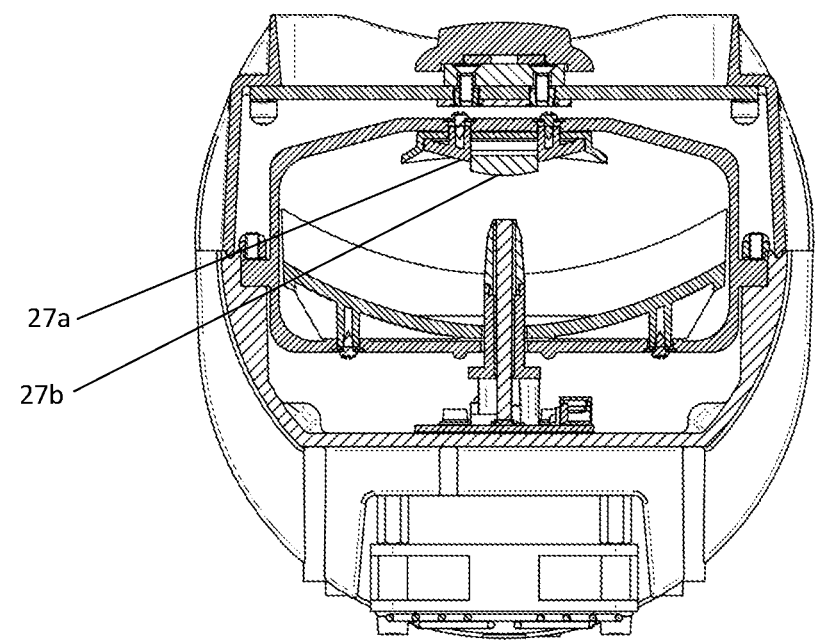
FIG. 8B is a schematic sectional view, with parts removed for clarity, of a lighting device having a movable primary mirror in Position B.

According to a further example shown in FIG. 8A and FIG. 8B, the primary reflecting surface may comprise portions 27a and 27b movable with respect to each other to achieve effects of varying the shape of the light beam emitted by the lighting device 2. FIG. 8A shows portion 27b in Position A, whereas FIG. 8B shows portion 27b in Position B.

The secondary mirror 12 is arranged as facing the primary mirror 11 to reflect the light beam reflected by the primary mirror 11 towards the emission area surrounding the primary mirror 11. In other words, the light beam emission area of the lighting device 2 extends around the primary mirror 11.

The secondary mirror 12 is arranged about the axis B. In particular, the secondary mirror 12 has a hole 29 substantially centered on the axis B wherein the light guide 10 is housed.

The secondary mirror 12 is preferably concave. Preferably, the perimeter of the secondary mirror 12 has a shape complementary to the shape of the projection outlet 15.

In the non-limiting example herein described and shown, the perimeter of the secondary mirror 12 is substantially rectangular. The secondary mirror 12 has a secondary reflection surface 30, facing the projection outlet 15. The secondary reflecting surface 30 has at least a second portion having a hyperbolic shape or an aspherical shape of even order and degree equal to or greater than four.

Preferably, the second portion of the secondary reflecting surface 30 is hyperbolic if the first portion of the primary reflecting surface 27 of the primary mirror 11 has a hyperbolic shape, or has an aspherical shape of even order and degree equal to or greater than four if the first portion of the primary reflecting surface 27 of the primary mirror 11 has an aspherical shape of even order and degree equal to or greater than four.

Preferably, the secondary reflecting surface 30 has an axisymmetric shape.

In the non-limiting example herein described and shown, the entire secondary reflecting surface 30 has a hyperbolic shape.

According to another example not shown, the secondary reflecting surface 30 has a toric shape.

Figure 7:
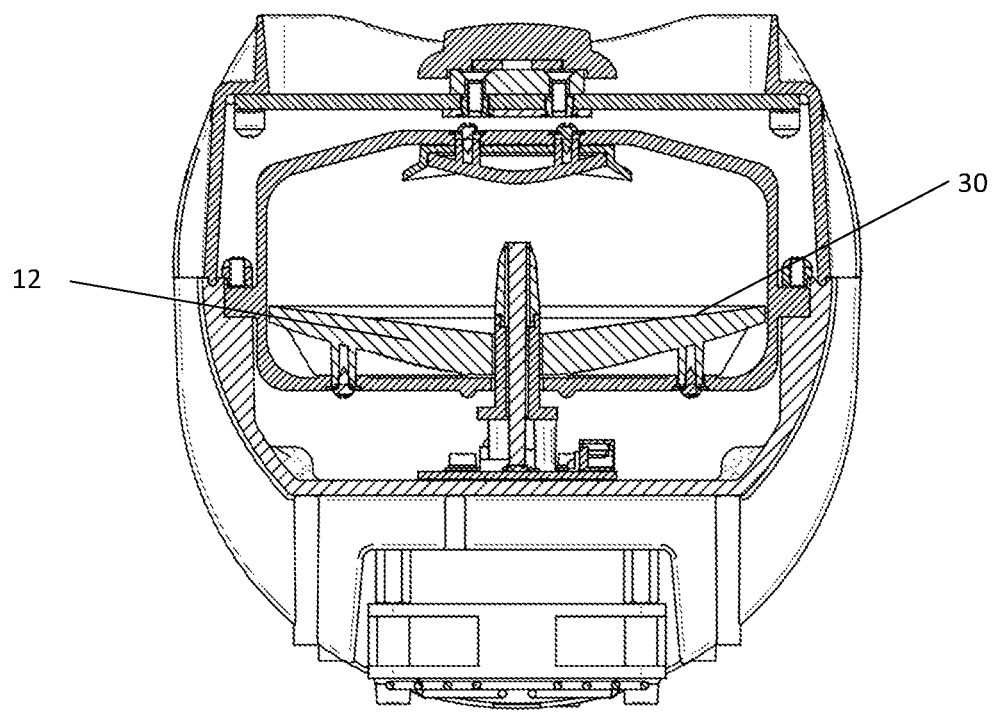
FIG. 7 is a schematic sectional view, with parts removed for clarity, of a lighting device having a secondary mirror including a third portion.

According to yet another example shown in FIG. 7, the secondary reflecting surface comprises at least one further portion having a hyperbolic shape, preferably different from the hyperbolic shape of the second portion, or an aspherical shape of even order and degree equal to or greater than four preferably different from the aspherical shape of even order and degree equal to or greater than four of the second portion.

Figure 9A:
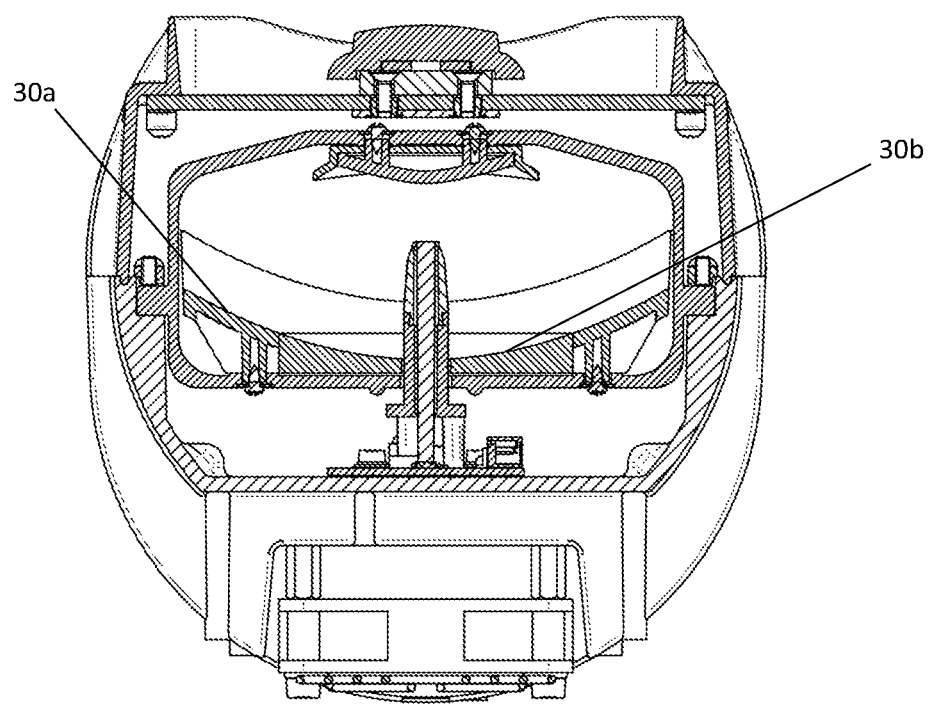
FIG. 9A is a schematic sectional view, with parts removed for clarity, of a lighting device having a movable secondary mirror in Position A.
Figure 9B:
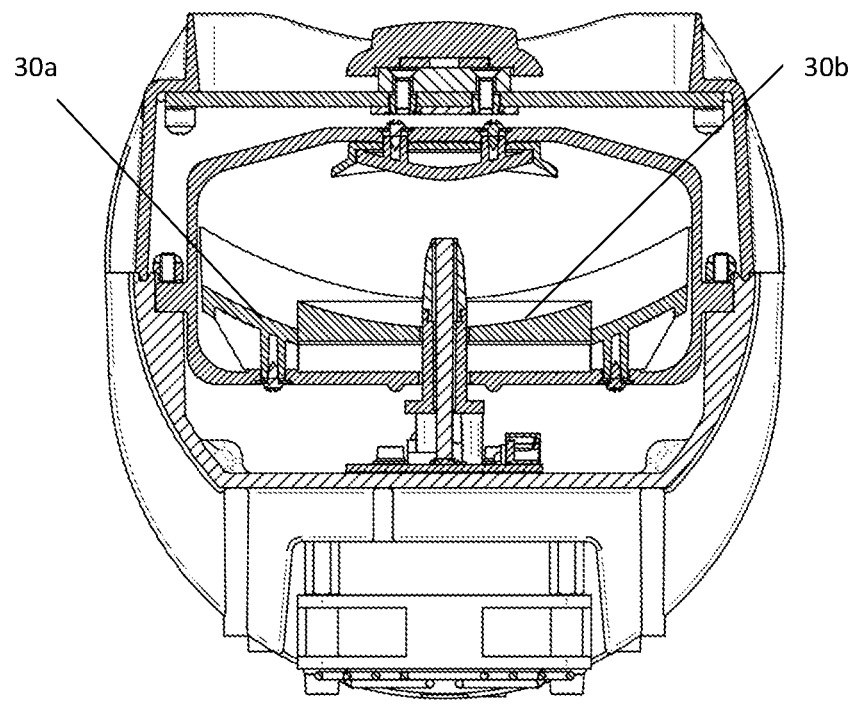
FIG. 9B is a schematic sectional view, with parts removed for clarity, of a lighting device having a movable secondary mirror in Position B.

According to a further example shown in FIG. 9A and FIG. 9B, the secondary reflecting surface may comprise portions 30a and 30b that are movable with respect to each other to achieve effects of varying the shape of the light beam emitted by the lighting device 2. FIG. 9A shows portion 30b in Position A, whereas FIG. 9B shows portion 30b in Position B.

Further examples not shown provide that the primary mirror 11 and/or secondary mirror 12 and/or the light guide 10 are movable within the casing 6 to regulate the exit angle of the light beam or the shape thereof.

Figure 4:
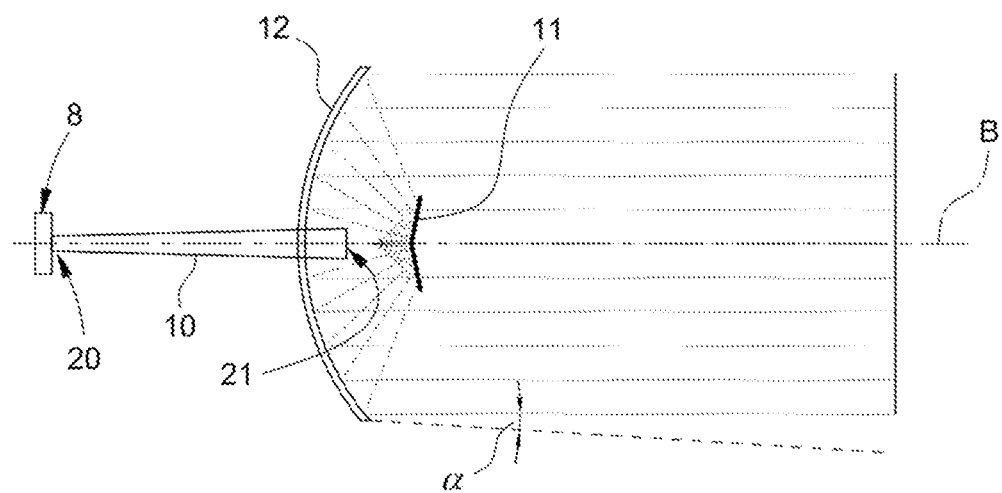
FIG. 4 is a schematic sectional representation, with parts removed for clarity, of a first detail of the lighting device of FIG. 2 wherein the optical light path is schematically shown.

Referring to FIG. 4, the particular arrangement and shape of the primary mirror 11 and the secondary mirror 12 results in the emission of a highly collimated light beam with an exit angle α of the emitted light beam of less than 3°. The light beam obtained by the described configuration is therefore cohesive, collimated and concentrated.

Moreover, the particular arrangement and shape of the primary mirror 11 and secondary mirror 12 has allowed to minimize the dimensions of the primary mirror 11 so that the "free," i.e., "unobstructed" emission area of the light beam of the lighting device 2 is greater than 50% of the overall area defined by the projection outlet 15. Preferably, the "free," i.e., "unobstructed" emission area of light beam of the lighting device 2 is equal to 75%.

Finally, modifications and variations can be made to the lighting device and light fixture described herein without departing from the scope of the appended claims.

This application claims priority from Italian Patent Appln. No. 102021000011456 filed on May 5, 2021, the entire disclosure of which is incorporated herein by reference.

The invention claimed is:

1. A lighting device that produces scenic effects comprising:
   a light source assembly;
   a light guide extending along a longitudinal axis and coupled to the light source assembly that defines a defined optical path;
   a primary mirror arranged along the longitudinal axis facing the light source assembly to reflect the light beam coming out from the light guide; and
   a secondary mirror facing the primary mirror to reflect the light beam reflected by the primary mirror towards an emission area surrounding the primary mirror,
   wherein a primary reflecting surface of the primary mirror has at least one first portion having a first hyperbolic shape or a first aspherical shape of even order and degree equal to or greater than four and a secondary reflecting surface of the secondary mirror has at least one second portion having a second hyperbolic shape or a second aspherical shape of even order and degree equal to or greater than four, and
   the primary mirror is surrounded by a hood element, which diverges towards the light source assembly and is configured to prevent loss of light radiation.

2. The device according to claim 1, wherein the primary reflection surface of the primary mirror and/or the secondary reflection surface of the secondary mirror has an axisymmetric shape.

3. The device according to claim 1, wherein the primary reflection surface of the primary mirror and/or the secondary reflection surface of the secondary mirror is toric.

4. The device according to claim 1, wherein the primary reflecting surface of the primary mirror comprises a third portion having a third hyperbolic shape or a third aspherical shape of even order and degree equal to or greater than four.

5. The device according to claim 4, wherein the third hyperbolic shape is different from the first hyperbolic shape or the third aspherical shape is different from the first aspherical shape.

6. The device according to claim 4, wherein the third portion is movable relative to the first portion.

7. The device according to claim 4, wherein the secondary reflecting surface of the secondary mirror comprises a fourth portion having a fourth hyperbolic shape or a fourth aspherical shape of even order and degree equal to or greater than four.

8. The device according to claim 7, wherein the fourth hyperbolic shape is different from the second hyperbolic shape or the third aspherical shape is different from the second aspherical shape.

9. The device according to claim 7, wherein the fourth portion is movable relative to the second portion.

10. The device according to claim 1, wherein the secondary mirror is provided with a hole substantially centered on the longitudinal axis in which the light guide is housed.

11. The device according to claim 1, wherein the light guide is an optical tube provided with an inlet coupled to the light source assembly and an outlet, and the primary mirror is arranged at a distance of 10 and 19 mm from the outlet.

12. The device according to claim 1, further comprising a casing extending along the longitudinal axis and provided with a first closed end and a second end opposite the first closed end along the longitudinal axis and provided with a projection outlet that defines the emission area of the light beam, the casing provided with a closing element having a shape complementary to the projection outlet.

13. The device according to claim 12, wherein the projection outlet has a substantially square or rectangular cross-section.

14. The device according to claim 12, comprising an optical element selectively releasably coupled to the closure element.

15. A stage light fixture comprising a plurality of the lighting devices according to claim 1.

* * * * *